May 18, 1943.     O. S. OSBORNE     2,319,747
ARTICLE SUPPORT
Filed Sept. 15, 1941

Patented May 18, 1943

2,319,747

UNITED STATES PATENT OFFICE 2,319,747

ARTICLE SUPPORT

Orville S. Osborne, Syracuse, N. Y.

Application September 15, 1941, Serial No. 410,942

3 Claims. (Cl. 211—31)

This invention relates to article supports, and more especially to a simple and inexpensive appliance adapted to be attached to the upholstery fabric on the interior of automobiles and the like, for use in supporting hats, maps, magazines and newspaper and other articles within easy reach, yet in an out-of-the-way position.

To those who travel extensively by automobile, it is a great source of annoyance to have miscellaneous articles scattered about on the seats and elsewhere in the automobile where they may be broken, wrinkled or otherwise damaged or mutilated, and are not conveniently accessible when occasion demands. The untidiness of the interior of most automobiles and the frequent loss of small articles normally carried loosely in the automobile, is largely attributed to the lack of provision for convenient disposition of such articles, and this is particularly true of hats. Many drivers of automobiles prefer to go bareheaded when driving, but nevertheless have occasion to wear a hat at times, making it desirable to keep a hat available in the automobile. The usual place where the hat is disposed is on a seat or on a shelf provided at the rear of the seat in some automobiles. It is a matter of common experience that the hat will not remain where it is placed according to the usual practice, but rather will bounce around due to the vibration and jolts of the automobile, often becoming crushed between other luggage and soiled by rubbing against other articles or when the hat should happen to fall onto the floor.

Having these past experiences in mind, it has been my primary object to provide an easily and quickly attachable appliance for the interior of automobiles which is capable of supporting a hat in an inverted position against the roof of the automobile where it is normally out of the way, yet is conveniently accessible to the driver or to other occupants, as the case may be.

To this end, my invention particularly contemplates the provision of a pair of elastic cords or other yieldably elongatable members which are attached at their opposite ends to suitable fasteners, preferably of the pin type, which serve to pin the opposite ends of the cords to the upholstery fabric on the roof of an automobile so that a hat may be interposed in an inverted position between the roof and the cords, with the cords straddling the crown of the hat and underlying the hat brim at opposite sides of the crown, thus effectively supporting the hat and preventing its inadvertent displacement.

Another important object of the invention resides in a simple and improved means for attaching the elastic members to the pin fasteners, said means preferably having the form of a special type of clip which serves to tightly grip the ends of the elastic members together and maintain the corresponding ends of the pair of members in contiguous relation while at the same time serving to interlock the contiguous end with a pin fastener member.

A further object of the invention is to provide a support of the aforementioned character which readily lends itself to use as an advertising medium by affording a suitable and prominent display surface, preferably as a part thereof, which may be stamped, printed, colored and/or otherwise identified with the advertiser. Contributing to this object is the low cost of manufacture and simplicity of form of the invention which makes it entirely practical and feasible for use as an inexpensive premium article or gift.

Other and further objects of the invention will be hereinafter described, and the novel features thereof defined by the appended claims.

In the drawing:

Figure 1 is a fragmentary perspective view of the interior of a conventional automobile, showing my invention applied thereto as preferably used for supporting a hat;

Figure 2 is a view partly in front elevation and partly in rear elevation of the supporting device itself as detached from the automobile;

Figure 3 is an enlarged fragmentary detail view in rear elevation, showing the pin fastener at one end of the supporting device;

Figure 4 is a sectional view taken on the line 4—4 of Figure 3;

Figure 5 is a sectional view generally similar to Figure 4, but showing the elastic cords of the device in the course of being attached to one of the pin fasteners;

Figure 6 is a sectional view taken on the line 6—6 of Figure 4;

Figure 7 is a perspective view of one of the clips for gripping together the ends of a pair of elastic cords and attaching the cords to a pin fastener, the clip being open to receive the cords and the ends of the cords being shown in broken lines; and Figure 8 is a fragmentary perspective view showing the clip in its closed position gripping the ends of a pair of elastic cords.

Like reference characters designate corresponding parts in the several figures of the drawing wherein 1 generally denotes a conventional automobile, the roof of which is usually covered by suitable upholstery fabric as indicated at 2. Removably attached to the fabric 2 is a supporting device, generally indicated by the reference character 3, which is particularly intended to support a hat as indicated at 4. While a hat 4 has been illustrated as being supported by the device 3, it is to be understood that the device is not limited to this particular use, since other miscellaneous articles such as maps, magazines, newspapers and the like may be supported thereby against the roof of the automobile as will be obvious. It is also to be understood that instead of applying the device 3 to the roof of the automobile, it may be attached to any other convenient part of the vehicle which may be upholstered, such as to the back of the seat or to one of the door panels, although the roof is the most logical place for attaching the device where the article supported thereby will be out of the way and less likely to be damaged by contact with any luggage which may be carried within the vehicle or by the entrance and exit of the occupants of the vehicle.

Referring particularly to Figure 2 of the drawing, 5, 5 designates a pair of elongated elastic members which are preferably formed of cords of equal length. Such cords composed of a rubber or other elastic core and covered by fabric may be procured on the market as stock material and may be conveniently employed for the purposes of this invention, but it is to be understood that the shape and construction of the cords may be varied without departing from the principles of the invention. Attached to the respective opposite ends of the pair of cords 5, 5 is a fastener member generally indicated at 6, each fastener member preferably comprising a pin member 7 of the double shank type for penetrating the fabric so as to detachably secure the elastic cords 5, 5 to the interior of the vehicle as shown in Figure 1. Each fastener member 6 also preferably includes a button-shaped head 8 from which the pin shanks 7 extend and to which the contiguous ends of the elastic cords 5, 5 are secured at the rear thereof. The front surface of the button heads 8 may be suitably stamped, printed, colored, or otherwise marked with suitable advertising matter, if desired, to serve as a medium of advertising which identifies the source of the supporting device or appliance. Otherwise, the button heads 8 and/or the elastic cords 5, 5 may be suitably colored to match the interior trim or upholstery of the vehicle to which the same is to be applied.

In securing the opposite ends of the elastic cords 5, 5 to the fasteners 6, 6, the corresponding ends of the cords are brought together in side by side relation and are closely embraced by a clip member generally designated 9, as best shown in Figures 7 and 8. Each clip member is preferably made of sheet metal and is normally bent into U-shape with its opposite sides 10, 10 arranged in spaced relation to each other to permit the ends of the cords 5, 5 to be seated in the clip. The free edges of the sides 10, 10 of the clip 9 are serrated as at 11, with the serrations bent over slightly inwardly away from the plane of the sides 10, 10 so that when the sides are folded towards each other to grip the respective cords 5, 5, as indicated in Figure 8, the serrations 11 will penetrate the respective cords and thereby firmly interlock the clip onto the ends of the cords. Each clip is also preferably provided with a tongue 12 partially overlying the end of the clip opposite to the end from which the cords 5, 5 extend.

Before passing to the manner of attachment of the ends of the cords 5, 5, to the fasteners 6, 6, it is desirable to point out that the button heads 8 are preferably formed of sheet metal and are dished to provide an annular skirt 13 curving inwardly and rearwardly from the front surface 8 of the button head, thereby forming a cavity or recess at the rear of each button head. At one side of each button head, the annular flange 13 is extended in the form of a tongue 14 which is reversely folded inwardly towards the back side of the body of the button head, as best indicated in Figures 3 to 5. Disposed opposite to the tongue 14 and formed integrally with the annular flange 13 is another tongue 15 which in the final assembly of the pin members 7 onto the opposite ends of the elastic cords 5, 5, overlies the cavity or recess at the rear of each button head, the tongue 15 projecting a substantial distance inwardly from the corresponding edge of the button head on which it is formed. The tongue 15 is bendable so that it may be moved from its normal position shown in Figure 4 to a corresponding position shown in Figure 5, for reasons which will hereinafter more fully appear.

The pin members 7 each preferably comprise an elongated body pointed at each end and bent into U-shaped form with the opposite sides thereof lying generally parallel to each other and forming the double shanks 16, 16. The base of each pin member from which the double shanks 16, 16 extend is bent upon itself as best indicated at 17 in Figure 5 and is received in the recess at the back of the button head 8, with the extreme base of the pin lying below the tongue 15. The other tongue 14 on the button head 8 is firmly wedged against the pin at the base of the reverse bend indicated at 18 so that the pin is firmly attached to the button head with the double shanks 16, 16 disposed at the rear of the button head and extending laterally therefrom.

To assemble a pin fastener 6 onto each of the opposite ends of the elastic cords 5, 5, the bendable tongue 15 at the back of the button head 8 is positioned in a partially open position as indicated in Figure 5, whereupon the clip 9 in which the contiguous ends of the cords 5, 5 are firmly gripped is inserted into the recess at the back of the button head by entering the inner end of the clip beneath the tongue 15, and then forcing the outer end of the clip downwardly in the direction of the arrow shown in Figure 5. As the outer end of the clip is forced downwardly into the recess at the back of the button head, the tongue 12 on the outer end of the clip will become firmly wedged against the inwardly folded tongue 14, with the clip nested between the shanks 16, 16 of the pin and seated against the reversely bent part of the pin designated 17. Thereupon, the bendable part 15 of the button head is bent over against the adjacent end of the clip 9 to partially overlie the clip at the rear thereof and positively prevent the corresponding end of the clip from becoming displaced from the recess in the button head. The finally assembled position of the parts is best shown in Figures 3 and 4, and it will be seen that the elastic cords 5, 5 extend laterally from the back of the button head in the general direction of the pin shanks 16, 16, with the cords disposed at opposite sides of the bendable tongue

15. Thus, any strain or tension imparted to the elastic cords 5, 5 will be transmitted to the button head 8 at the side of the latter which carries the bendable tongue 15, but since the bendable tongue overlies the clip 9 at the rear thereof, the clip will not become displaced from the button head in spite of the fact that the opposite end of the clip is held in place primarily by frictional contact between the end of the clip and the inwardly folded tongue 14. The elastic cords 5, 5 may be simply and quickly detached from the pin fastener 6 if occasion requires, by lifting the bendable tongue 15 to its position shown in Figure 5, and then prying the extreme outer end of the clip 9 in an upward direction opposite to the direction indicated by the arrow in Figure 5. Thereupon, the clip may be bodily removed from the recess at the back of the button head 8.

To install the device in the interior of an automobile, the pin fasteners 6, 6 at the opposite ends of the pair of elastic cords 5, 5 are inserted into the upholstery fabric at any suitable point, preferably overhead or somewhat to the rear of the driver's seat, the pins penetrating the fabric at the seam if possible. In pinning the pins to the fabric, the pins are spaced apart longitudinally of the supporting device for a distance sufficient to take up the slack in the elastic cords, and without substantially tensioning the cords so that they will be more or less relaxed and free to yield away from the portion of the vehicle to which the device is attached, and also away from each other as required for placing a hat in position to be supported thereby.

In Figure 1 of the drawing, the supporting device is shown in broken lines in its applied position with the elastic cords extending between the pin fasteners 6, 6, the cords lying generally parallel to each other and relatively close together without slack. To support a hat, the cords are stretched away from the fabric to which the pin fasteners are attached, and the hat is introduced between the cords and the fabric in an inverted position, the cords being separated to allow the crown of the hat to depend therebetween, while the cords underlie the brim of the hat at opposite sides of the hat crown.

For lightweight hats, the pin fasteners may be attached to the support closer together, allowing the cords to sag so that the hat may be cradled therein, so to speak.

The invention may also be applied to the lower surface of a shelf, such as a closet shelf. For such use, the pin fasteners 6, 6 may be detached from the cords 5, 5 by removing the clip 9 from its seat in the back of the button head 8 of its corresponding pin fastener. When the pin fasteners have been removed, the cords may then be conveniently attached to the shelf by a nail, tack, screw, or the like, inserted between the cords 5, 5 at the inner ends of the clips 9 on the opposite ends of the cords, the nails, tacks or screws, as the case may be being entered into the shelf surface preferably while the cords are lightly tensioned to prevent the same from becoming inadvertently displaced from the fastener instrumentalities.

While the specific details have been herein shown and described, the invention is not confined thereto, as changes and alterations may be made without departing from the spirit thereof as defined by the appended claims.

I claim:

1. An article supporting device of the class described, comprising a pair of contiguously arranged normally parallel elastic strands of equal length, a pair of clip members of bendable material each folded about and firmly embracing the corresponding ends of said elastic strands to fix the same together at the opposite ends of the pair of strands and to form a unitary assembly, each of said clip members being of substantial length to embrace a substantial length of the strands, and a fastener member fixed to each of the opposite ends of said pair of strands to secure the strands to a support for the reception of an article to be supported thereby, each of said fastener members including a button-like body having a recess in one face thereof of a size to snugly receive the clip member at the corresponding end of the pair of strands, with the clip member disposed generally diametrically of the body, and said body having a bendable tongue at one edge thereof normally overlying the recess aforesaid at the outer side of the clip member to prevent inadvertent displacement of the clip member from the recess.

2. A device as claimed in claim 1, wherein the snug reception of the clip member within the recess of the corresponding button-like body is effected by frictional engagement of the opposite ends of the clip member with the corresponding ends of the recess, and the bendable tongue on the body is disposed to overlie the innermost end of the clip member.

3. An article supporting device of the class described, comprising a pair of contiguously arranged normally parallel elastic strands of equal length, a pair of clip members of bendable material each folded about and firmly embracing the corresponding ends of said elastic strands to fix the same together at the opposite ends of the pair of strands and to form a unitary assembly, each of said clip members being of substantial length to embrace a substantial length of the strands, and a fastener member fixed to each of the opposite ends of said pair of strands to secure the strands to a support for the reception of an article to be supported thereby, each of said fastener members including a button-like body having a recess in one face thereof of a size to snugly receive the clip member at the corresponding end of the pair of strands, with the clip member disposed generally diametrically of the body, said body having a bendable tongue at one edge thereof normally overlying the recess aforesaid at the outer side of the clip member to prevent inadvertent displacement of the clip member from the recess, and a double-pointed pin having a head reversely bent over upon the shanks thereof and spaced from the latter, with the head fixed within the bottom of the recess of the body and the shanks extending across the outer side of the recess and beyond the edge of the body in the direction of and generally parallel to the strands.

ORVILLE S. OSBORNE.